United States Patent
Swaminathan et al.

(10) Patent No.: US 9,665,840 B2
(45) Date of Patent: May 30, 2017

(54) HIGH PERFORMANCE ERP SYSTEM ENSURING DESIRED DELIVERY SEQUENCING OF OUTPUT MESSAGES

(71) Applicant: Oracle International Corporation, Redwood Shores, CA (US)

(72) Inventors: Senthilnathan Veeraswamy Swaminathan, Bangalore (IN); Ramesh Nittur Anantharamaiah, Bangalore (IN); Prasanna Bhadravathi Chandrashekhara, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 230 days.

(21) Appl. No.: 14/453,657

(22) Filed: Aug. 7, 2014

(65) Prior Publication Data
US 2015/0271253 A1 Sep. 24, 2015

Related U.S. Application Data

(60) Provisional application No. 61/968,382, filed on Mar. 21, 2014.

(51) Int. Cl.
*G06F 15/16* (2006.01)
*G06Q 10/06* (2012.01)
*H04L 29/08* (2006.01)

(52) U.S. Cl.
CPC .......... *G06Q 10/06* (2013.01); *H04L 67/325* (2013.01); *H04L 67/327* (2013.01); *H04L 69/329* (2013.01)

(58) Field of Classification Search
None
See application file for complete search history.

(56) References Cited

U.S. PATENT DOCUMENTS 6,052,363 A  4/2000 Koch
7,580,979 B2 8/2009 Flaherty
(Continued)

FOREIGN PATENT DOCUMENTS

IE  EP 2811437 A1 * 12/2014 ............ G06F 9/544

OTHER PUBLICATIONS

Singhal and Shivaratri, "Birman-Schiper-Stephenson Protocol", http://courses.cs.vt.edu/~cs5204/fall00/causal.html, Dated : Feb. 21, 1995, pp. 1-2.
(Continued)

*Primary Examiner* — Aftab N. Khan
*Assistant Examiner* — John Fan
(74) *Attorney, Agent, or Firm* — Iphorizons PLLC; Narendra Reddy Thappeta

(57) ABSTRACT

An embodiment of the present disclosure receives a respective set of input messages from a corresponding source system, with the messages of each set of input messages being received in a corresponding chronological (time) order. The input messages are processed using parallel processing approaches to generate corresponding output messages, with each output message being generated for delivery to a corresponding destination system. The destination system for each output message is identified only during such processing of the input messages. The output messages are queued and an output message to a destination system is transmitted only after output messages of all prior input messages from the same source system to the destination system are transmitted, while permitting output messages generated by processing of input messages from different source systems being permitted to be transmitted out-of-sequence.

19 Claims, 20 Drawing Sheets

(56) References Cited

U.S. PATENT DOCUMENTS

| | | | |
|---|---|---|---|
| 8,015,256 B2 | 9/2011 | Pacheco | |
| 8,023,408 B2 | 9/2011 | Herrmann | |
| 8,200,765 B2 | 6/2012 | Bittles | |
| 8,218,549 B2 | 7/2012 | Dekel | |
| 8,364,743 B2 | 1/2013 | Parkinson | |
| 9,262,241 B2* | 2/2016 | Giannone | G06F 9/544 |
| 2007/0067471 A1* | 3/2007 | Wolfe | H04L 69/08 709/230 |
| 2007/0118601 A1* | 5/2007 | Pacheco | H04L 12/5693 709/206 |
| 2008/0148275 A1 | 6/2008 | Krits | |
| 2008/0201712 A1 | 8/2008 | Nottingham | |
| 2009/0144385 A1 | 6/2009 | Gold | |
| 2010/0005147 A1 | 1/2010 | Johnson, III | |
| 2010/0257240 A1 | 10/2010 | Singh | |
| 2010/0303073 A1* | 12/2010 | Kubo | H04L 12/1886 370/390 |
| 2011/0282949 A1* | 11/2011 | Rivkin | G06F 9/541 709/206 |
| 2012/0047518 A1 | 2/2012 | Parkinson | |
| 2013/0034039 A1* | 2/2013 | Wong | H04L 12/189 370/312 |
| 2013/0081063 A1 | 3/2013 | Hosie | |
| 2013/0258860 A1* | 10/2013 | King | H04L 12/462 370/241 |

OTHER PUBLICATIONS

"Birman-Schiper-Stephenson Protocol", http://www.scribd.com/fullscreen/50939999?access_key=key-1ln7iwv1gjx9c1ye6hyo&allow_share=true&escape=false&view_mode=scroll, Dated Download circa: Feb. 17, 2014, pp. 1-2.

Paul A.S. Ward, "Algorithms for Causal Message Ordering in Distributed Systems", http://citeseerx.ist.psu.edu/viewdoc/download?doi=10.1.1.92.1137&rep=rep1&type=pdf Dated Download circa: Feb. 17, 2014, pp. 1-17.

Kenneth Birman, Andre Schiper and Pat Stephenson, "Fast Causal Multicast", Department of Computer Science, Cornell University Dated: Apr. 10, 1990, pp. 1-34.

André Schiper, Jorge Eggli and Alain Sandoz, "A new algorithm to implement causal ordering", http://link.springer.com/chapter/10.1007%2F3-540-51687-5_45#page-1, vol. 392, 1989, Dated: Jun. 2, 2005, p. 1.

"Message sequencing", http://publib.boulder.ibm.com/infocenter/wmbhelp/v7r0m0/index.jsp?topic=%2Fcom.ibm.etools.mft.doc%2Fbc28020_.htm, Dated Download circa: Nov. 26, 2014, pp. 1-2.

Using Message Unit-of-Order, http://docs.oracle.com/cd/E12840_01/wls/docs103/jms/uoo.html, Dated Download circa: Nov. 26, 2014, pp. 1-9.

Channel message sequence numbering, http://publib.boulder.ibm.com/infocenter/wmqv7/v7r0/index.jsp?topic=%2Fcom.ibm.mq.csqzae.doc%2Fic11080_.htm, Dated Oct. 1, 2013, p. 1.

* cited by examiner

| | Message Identifier 711 | Sort Field 712 | Input message Identifier 713 | Source system 714 | Destination System 715 | Group Count 716 | Direction 717 | State 718 |
|---|---|---|---|---|---|---|---|---|
| 721 → | SA1 | 2014-03-05 14:39:30.252 | | AI | | | INBOUND | ROUTING |
| 722 → | SA2 | 2014-03-05 14:39:32.262 | | AI | | | INBOUND | ROUTING |
| 723 → | SB1 | 2014-03-05 14:40:00.152 | | BI | | | INBOUND | ROUTING |
| 724 → | SB2 | 2014-03-05 14:40:30.0 | | BI | | | INBOUND | ROUTING |
| 725 → | SA3 | 2014-03-05 14:42:0.0 | | AI | | | INBOUND | ROUTING |
| 726 → | SC1 | 2014-03-05 14:42:30.11 | | CI | | | INBOUND | ROUTING |
| 727 → | SA4 | 2014-03-05 14:49:30.22 | | AI | | | INBOUND | ROUTING |
| 728 → | SC2 | 2014-03-05 14:59:30.0 | | CI | | | INBOUND | ROUTING |
| 729 → | SD1 | 2014-03-05 15:00:00.101 | | DI | | | INBOUND | ROUTING |

| | Message Identifier (711) | Sort Field (712) | Input message Identifier (713) | Source system (714) | Destination System (715) | Group Count (716) | Direction (717) | State (718) |
|---|---|---|---|---|---|---|---|---|
| 721 → | SA1 | 2014-03-05 14:39:30.252 | | AI | | | INBOUND | ROUTING |
| 722 → | SA2 | 2014-03-05 14:39:32.262 | | AI | | | INBOUND | QUEUED |
| 723 → | SB1 | 2014-03-05 14:40:00.152 | | BI | | | INBOUND | ROUTING |
| 724 → | SB2 | 2014-03-05 14:40:30.0 | | BI | | | INBOUND | QUEUED |
| 725 → | SA3 | 2014-03-05 14:42:0.0 | | AI | | | INBOUND | QUEUED |
| 726 → | SC1 | 2014-03-05 14:42:30.11 | | CI | | | INBOUND | ROUTING |
| 727 → | SA4 | 2014-03-05 14:49:30.22 | | AI | | | INBOUND | QUEUED |
| 728 → | SC2 | 2014-03-05 14:59:30.0 | | CI | | | INBOUND | QUEUED |
| 729 → | SD1 | 2014-03-05 15:00:00.101 | | DI | | | INBOUND | QUEUED |
| 741 → | DA4 | 2014-03-05 14:49:30.22 | SA4 | AI | AO | 1 | INTERFACE_OUTBOUND | GENERATED |
| 742 → | DB2 | 2014-03-05 14:40:30.0 | SB2 | BI | AO | 1 | INTERFACE_OUTBOUND | GENERATED |
| 743 → | DA3 | 2014-03-05 14:42:0.0 | SA3 | AI | BO | 1 | INTERFACE_OUTBOUND | GENERATED |
| 744 → | DA2 | 2014-03-05 14:39:32.262 | SA2 | AI | AO | 1 | INTERFACE_OUTBOUND | GENERATED |
| 745 → | DC2 | 2014-03-05 14:59:30.0 | SC2 | CI | CO | 1 | INTERFACE_OUTBOUND | GENERATED |
| 746 → | DD1 | 2014-03-05 15:00:00.101 | SD1 | DI | AO | 1 | INTERFACE_OUTBOUND | GENERATED |

FIG. 7C

| | Message Identifier | Sort Field | Input message Identifier | Source system | Destination System | Group Count | Direction | State |
|---|---|---|---|---|---|---|---|---|
| 721 → | SA1 | 2014-03-05 14:39:30.252 | | AI | | | INBOUND | ROUTING |
| 722 → | SA2 | 2014-03-05 14:39:32.262 | | AI | | | INBOUND | QUEUED |
| 723 → | SB1 | 2014-03-05 14:40:00.152 | | BI | | | INBOUND | ROUTING |
| 724 → | SB2 | 2014-03-05 14:40:30.0 | | BI | | | INBOUND | QUEUED |
| 725 → | SA3 | 2014-03-05 14:42:0.0 | | AI | | | INBOUND | QUEUED |
| 726 → | SC1 | 2014-03-05 14:42:30.11 | | CI | | | INBOUND | ROUTING |
| 727 → | SA4 | 2014-03-05 14:49:30.22 | | AI | | | INBOUND | QUEUED |
| 728 → | SC2 | 2014-03-05 14:59:30.0 | | CI | | | INBOUND | QUEUED |
| 729 → | SD1 | 2014-03-05 15:00:00.101 | | DI | | | INBOUND | QUEUED |
| 741 → | DA4 | 2014-03-05 14:49:30.22 | SA4 | AI | AO | 1 | INTERFACE_OUTBOUND | TRANSFORMED |
| 742 → | DB2 | 2014-03-05 14:40:30.0 | SB2 | BI | AO | 1 | INTERFACE_OUTBOUND | TRANSFORMED |
| 743 → | DA3 | 2014-03-05 14:42:0.0 | SA3 | AI | BO | 1 | INTERFACE_OUTBOUND | TRANSFORMED |
| 744 → | DA2 | 2014-03-05 14:39:32.262 | SA2 | AI | AO | 1 | INTERFACE_OUTBOUND | TRANSFORMED |
| 745 → | DC2 | 2014-03-05 14:59:30.0 | SC2 | CI | CO | 1 | INTERFACE_OUTBOUND | TRANSFORMED |
| 746 → | DD1 | 2014-03-05 15:00:00.101 | SD1 | DI | AO | 1 | INTERFACE_OUTBOUND | TRANSFORMED |

Columns: 711, 712, 713, 714, 715, 716, 717, 718

| | Message Identifier 711 | Sort Field 712 | Input message Identifier 713 | Source system 714 | Destination System 715 | Group Count 716 | Direction 717 | State 718 |
|---|---|---|---|---|---|---|---|---|
| 721 → | SA1 | 2014-03-05 14:39:30.252 | | AI | | | INBOUND | ROUTING |
| 722 → | SA2 | 2014-03-05 14:39:32.262 | | AI | | | INBOUND | QUEUED |
| 723 → | SB1 | 2014-03-05 14:40:00.152 | | BI | | | INBOUND | ROUTING |
| 724 → | SB2 | 2014-03-05 14:40:30.0 | | BI | | | INBOUND | QUEUED |
| 725 → | SA3 | 2014-03-05 14:42:0.0 | | AI | | | INBOUND | QUEUED |
| 726 → | SC1 | 2014-03-05 14:42:30.11 | | CI | | | INBOUND | ROUTING |
| 727 → | SA4 | 2014-03-05 14:49:30.22 | | AI | | | INBOUND | QUEUED |
| 728 → | SC2 | 2014-03-05 14:59:30.0 | | CI | | | INBOUND | QUEUED |
| 741 → | DA4 | 2014-03-05 14:49:30.22 | SA4 | AI | AO | 1 | INTERFACE_OUTBOUND | TRANSFORMED |
| 742 → | DB2 | 2014-03-05 14:40:30.0 | SB2 | BI | AO | 1 | INTERFACE_OUTBOUND | TRANSFORMED |
| 743 → | DA3 | 2014-03-05 14:42:0.0 | SA3 | AI | BO | 1 | INTERFACE_OUTBOUND | TRANSFORMED |
| 744 → | DA2 | 2014-03-05 14:39:32.262 | SA2 | AI | AO | 1 | INTERFACE_OUTBOUND | TRANSFORMED |
| 745 → | DC2 | 2014-03-05 14:59:30.0 | SC2 | CI | CO | 1 | INTERFACE_OUTBOUND | TRANSFORMED |
| 746 → | DD1 | 2014-03-05 15:00:00.101 | SD1 | DI | AO | 1 | OUTBOUND | TRANSFORMED |

*FIG. 7D*

| | Message Identifier | Sort Field | Input message Identifier | Source system | Destination System | Group Count | Direction | State |
|---|---|---|---|---|---|---|---|---|
| 721 → | SA1 | 2014-03-05 14:39:30.252 | | AI | | | INBOUND | QUEUED |
| 722 → | SA2 | 2014-03-05 14:39:32.262 | | AI | | | INBOUND | QUEUED |
| 723 → | SB1 | 2014-03-05 14:40:00.152 | | BI | | | INBOUND | QUEUED |
| 724 → | SB2 | 2014-03-05 14:40:30.0 | | BI | | | INBOUND | QUEUED |
| 725 → | SA3 | 2014-03-05 14:42:0.0 | | AI | | | INBOUND | QUEUED |
| 726 → | SC1 | 2014-03-05 14:42:30.11 | | CI | | | INBOUND | QUEUED |
| 727 → | SA4 | 2014-03-05 14:49:30.22 | | AI | | | INBOUND | QUEUED |
| 728 → | SC2 | 2014-03-05 14:59:30.0 | | CI | | | INBOUND | QUEUED |
| 741 → | DA4 | 2014-03-05 14:49:30.22 | SA4 | AI | AO | 1 | INTERFACE_OUTBOUND | TRANSFORMED |
| 742 → | DB2 | 2014-03-05 14:40:30.0 | SB2 | BI | AO | 1 | INTERFACE_OUTBOUND | TRANSFORMED |
| 743 → | DA3 | 2014-03-05 14:42:0.0 | SA3 | AI | BO | 1 | INTERFACE_OUTBOUND | TRANSFORMED |
| 744 → | DA2 | 2014-03-05 14:39:32.262 | SA2 | AI | AO | 1 | INTERFACE_OUTBOUND | TRANSFORMED |
| 745 → | DC2 | 2014-03-05 14:59:30.0 | SC2 | CI | CO | 1 | INTERFACE_OUTBOUND | TRANSFORMED |
| 747 → | DB1 | 2014-03-05 14:40:00.152 | SB1 | BI | AO | 1 | INTERFACE_OUTBOUND | TRANSFORMED |
| 748 → | DC1 | 2014-03-05 14:42:30.11 | SC1 | CI | AO | 1 | INTERFACE_OUTBOUND | TRANSFORMED |
| 749 → | DA1 | 2014-03-05 14:39:30.252 | SA1 | AI | AO | 1 | INTERFACE_OUTBOUND | GENERATED |

*FIG. 7E*

| Message Identifier 711 | Sort Field 712 | Input message Identifier 713 | Source system 714 | Destination System 715 | Group Count 716 | Direction 717 | State 718 |
|---|---|---|---|---|---|---|---|
| SA1 | 2014-03-05 14:39:30.252 | | AI | | | INBOUND | QUEUED |
| SA2 | 2014-03-05 14:39:32.262 | | AI | | | INBOUND | QUEUED |
| SA4 | 2014-03-05 14:49:30.22 | | AI | | | INBOUND | QUEUED |
| DA4 | 2014-03-05 14:49:30.22 | SA4 | AI | AO | 1 | INTERFACE_OUTBOUND | TRANSFORMED |
| DB2 | 2014-03-05 14:40:30.0 | SB2 | BI | AO | 1 | OUTBOUND | TRANSFORMED |
| DA3 | 2014-03-05 14:42:0.0 | SA3 | AI | BO | 1 | OUTBOUND | TRANSFORMED |
| DA2 | 2014-03-05 14:39:32.262 | SA2 | AI | AO | 1 | INTERFACE_OUTBOUND | TRANSFORMED |
| DC2 | 2014-03-05 14:59:30.0 | SC2 | CI | CO | 1 | OUTBOUND | TRANSFORMED |
| DB1 | 2014-03-05 14:40:00.152 | SB1 | BI | AO | 1 | OUTBOUND | TRANSFORMED |
| DC1 | 2014-03-05 14:42:30.11 | SC1 | CI | AO | 1 | OUTBOUND | TRANSFORMED |
| DA1 | 2014-03-05 14:39:30.252 | SA1 | AI | AO | 1 | INTERFACE_OUTBOUND | GENERATED |

Row labels (left): 721, 722, 727, 741, 742, 743, 744, 745, 747, 748, 749

FIG. 7F

| Message Identifier | Sort Field | Input message Identifier | Source system | Destination System | Group Count | Direction | State |
|---|---|---|---|---|---|---|---|
| DA4 | 2014-03-05 14:49:30.22 | SA4 | AI | AO | | OUTBOUND | TRANSFORMED |
| DA2 | 2014-03-05 14:39:32.262 | SA2 | AI | AO | | OUTBOUND | TRANSFORMED |
| DA1 | 2014-03-05 14:39:30.252 | SA1 | AI | AO | | OUTBOUND | TRANSFORMED |

| Message identifier 811 | Sort field 812 | Input message Identifier 813 | Source system 814 | Destination system 815 | Group Count 816 | Direction 817 | State 818 |
|---|---|---|---|---|---|---|---|
| SA5 | 2014-03-05 17:01:00.101 | | AI | | | INBOUND | ROUTING |
| SB3 | 2014-03-05 17:02:00.101 | | BI | | | INBOUND | ROUTING |
| SB4 | 2014-03-05 17:03:00.101 | | BI | | | INBOUND | ROUTING |
| SA6 | 2014-03-05 17:04:00.101 | | AI | | | INBOUND | ROUTING |
| SA7 | 2014-03-05 17:05:00.101 | | AI | | | INBOUND | ROUTING |
| SC3 | 2014-03-05 17:06:00.101 | | CI | | | INBOUND | ROUTING |
| SB5 | 2014-03-05 17:07:00.101 | | BI | | | INBOUND | ROUTING |
| SB6 | 2014-03-05 17:08:00.101 | | BI | | | INBOUND | ROUTING |

| | Message identifier | Sort field | Input message Identifier | Source system | Destination system | Group Count | Direction | State |
|---|---|---|---|---|---|---|---|---|
| 831 → | SA5 | 2014-03-05 17:01:00.101 | | AI | | | INBOUND | QUEUED |
| 832 → | SB3 | 2014-03-05 17:02:00.101 | | BI | | | INBOUND | QUEUED |
| 833 → | SB4 | 2014-03-05 17:03:00.101 | | BI | | | INBOUND | ROUTING |
| 834 → | SA6 | 2014-03-05 17:04:00.101 | | AI | | | INBOUND | QUEUED |
| 835 → | SA7 | 2014-03-05 17:05:00.101 | | AI | | | INBOUND | QUEUED |
| 836 → | SC3 | 2014-03-05 17:06:00.101 | | CI | | | INBOUND | QUEUED |
| 837 → | SB5 | 2014-03-05 17:07:00.101 | | BI | | | INBOUND | QUEUED |
| 838 → | SB6 | 2014-03-05 17:08:00.101 | | BI | | | INBOUND | QUEUED |
| 851 → | DA6 | 2014-03-05 17:01:00.101 | SA6 | AI | BO | 1 | INTERFACE_OUTBOUND | GENERATED |
| 852 → | DB3 | 2014-03-05 17:02:00.101 | SB3 | BI | AO | 1 | INTERFACE_OUTBOUND | GENERATED |
| 853 → | DB42 | 2014-03-05 17:03:00.101 | SB4 | BI | BO | 3 | INTERFACE_OUTBOUND | GENERATED |
| 854 → | DB43 | 2014-03-05 17:03:00.101 | SB4 | BI | BO | 3 | INTERFACE_OUTBOUND | GENERATED |
| 855 → | DA5 | 2014-03-05 17:01:00.101 | SA5 | AI | BO | 1 | INTERFACE_OUTBOUND | GENERATED |
| 856 → | DA7 | 2014-03-05 17:05:00.101 | SA7 | AI | BO | 1 | INTERFACE_OUTBOUND | GENERATED |
| 857 → | DC3 | 2014-03-05 17:06:00.101 | SC3 | CI | BO | 1 | INTERFACE_OUTBOUND | GENERATED |
| 858 → | DB5 | 2014-03-05 17:07:00.101 | SB5 | BI | AO | 1 | INTERFACE_OUTBOUND | GENERATED |
| 859 → | DB6 | 2014-03-05 17:08:00.101 | SB6 | BI | CO | 1 | INTERFACE_OUTBOUND | GENERATED |

Columns: 811, 812, 813, 814, 815, 816, 817, 818

FIG. 8C

| | Message identifier 811 | Sort field 812 | Input message Identifier 813 | Source system 814 | Destination system 815 | Group Count 816 | Direction 817 | State 818 |
|---|---|---|---|---|---|---|---|---|
| 831 → | SA5 | 2014-03-05 17:01:00.101 | | AI | | | INBOUND | QUEUED |
| 832 → | SB3 | 2014-03-05 17:02:00.101 | | BI | | | INBOUND | QUEUED |
| 833 → | SB4 | 2014-03-05 17:03:00.101 | | BI | | | INBOUND | ROUTING |
| 834 → | SA6 | 2014-03-05 17:04:00.101 | | AI | | | INBOUND | QUEUED |
| 835 → | SA7 | 2014-03-05 17:05:00.101 | | AI | | | INBOUND | QUEUED |
| 836 → | SC3 | 2014-03-05 17:06:00.101 | | CI | | | INBOUND | QUEUED |
| 837 → | SB5 | 2014-03-05 17:07:00.101 | | BI | | | INBOUND | QUEUED |
| 838 → | SB6 | 2014-03-05 17:08:00.101 | | BI | | | INBOUND | QUEUED |
| 851 → | DA6 | 2014-03-05 17:01:00.101 | SA6 | AI | BO | 1 | INTERFACE_OUTBOUND | TRANSFORMED |
| 852 → | DB3 | 2014-03-05 17:02:00.101 | SB3 | BI | AO | 1 | INTERFACE_OUTBOUND | TRANSFORMED |
| 853 → | DB42 | 2014-03-05 17:03:00.101 | SB4 | BI | BO | 3 | INTERFACE_OUTBOUND | TRANSFORMED |
| 854 → | DB43 | 2014-03-05 17:03:00.101 | SB4 | BI | BO | 3 | INTERFACE_OUTBOUND | TRANSFORMED |
| 855 → | DA5 | 2014-03-05 17:01:00.101 | SA5 | AI | BO | 1 | INTERFACE_OUTBOUND | TRANSFORMED |
| 856 → | DA7 | 2014-03-05 17:05:00.101 | SA7 | AI | BO | 1 | INTERFACE_OUTBOUND | TRANSFORMED |
| 857 → | DC3 | 2014-03-05 17:06:00.101 | SC3 | CI | BO | 1 | INTERFACE_OUTBOUND | TRANSFORMED |
| 858 → | DB5 | 2014-03-05 17:07:00.101 | SB5 | BI | AO | 1 | INTERFACE_OUTBOUND | TRANSFORMED |
| 859 → | DB6 | 2014-03-05 17:08:00.101 | SB6 | BI | CO | 1 | INTERFACE_OUTBOUND | TRANSFORMED |

| | Message identifier | Sort field | Input message Identifier | Source system | Destination system | Group Count | Direction | State |
|---|---|---|---|---|---|---|---|---|
| 833 → | SB4 | 2014-03-05 17:03:00.101 | | BI | | | INBOUND | ROUTING |
| 837 → | SB5 | 2014-03-05 17:07:00.101 | | BI | | | INBOUND | QUEUED |
| 838 → | SB6 | 2014-03-05 17:08:00.101 | | BI | | | INBOUND | QUEUED |
| 851 → | DA6 | 2014-03-05 17:01:00.101 | SA6 | AI | BO | 1 | OUTBOUND | TRANSFORMED |
| 852 → | DB3 | 2014-03-05 17:02:00.101 | SB3 | BI | AO | 1 | OUTBOUND | TRANSFORMED |
| 853 → | DB42 | 2014-03-05 17:03:00.101 | SB4 | BI | BO | 3 | INTERFACE_OUTBOUND | TRANSFORMED |
| 854 → | DB43 | 2014-03-05 17:03:00.101 | SB4 | BI | BO | 3 | INTERFACE_OUTBOUND | TRANSFORMED |
| 855 → | DA5 | 2014-03-05 17:01:00.101 | SA5 | AI | BO | 1 | OUTBOUND | TRANSFORMED |
| 856 → | DA7 | 2014-03-05 17:05:00.101 | SA7 | AI | BO | 1 | OUTBOUND | TRANSFORMED |
| 857 → | DC3 | 2014-03-05 17:06:00.101 | SC3 | CI | BO | 1 | OUTBOUND | TRANSFORMED |
| 858 → | DB5 | 2014-03-05 17:07:00.101 | SB5 | BI | AO | 1 | INTERFACE_OUTBOUND | TRANSFORMED |
| 859 → | DB6 | 2014-03-05 17:08:00.101 | SB6 | BI | CO | 1 | INTERFACE_OUTBOUND | TRANSFORMED |

*FIG. 8D*

| Message identifier | Sort field | Input message Identifier | Source system | Destination system | Group Count | Direction | State |
|---|---|---|---|---|---|---|---|
| SB4 | 2014-03-05 17:03:00.101 | | BI | | | INBOUND | QUEUED |
| SB5 | 2014-03-05 17:07:00.101 | | BI | | | INBOUND | QUEUED |
| DB42 | 2014-03-05 17:03:00.101 | SB4 | BI | BO | 3 | INTERFACE_OUTBOUND | TRANSFORMED |
| DB43 | 2014-03-05 17:03:00.101 | SB4 | BI | BO | 3 | INTERFACE_OUTBOUND | TRANSFORMED |
| DB5 | 2014-03-05 17:07:00.101 | SB5 | BI | AO | 1 | INTERFACE_OUTBOUND | TRANSFORMED |
| DB6 | 2014-03-05 17:08:00.101 | SB6 | BI | CO | 1 | OUTBOUND | TRANSFORMED |
| DB41 | 2014-03-05 17:03:00.101 | SB4 | BI | AO | 3 | INTERFACE_OUTBOUND | GENERATED |

| Message identifier | Sort field | Input message Identifier | Source system | Destination system | Group Count | Direction | State |
|---|---|---|---|---|---|---|---|
| DB42 | 2014-03-05 17:03:00.101 | SB4 | BI | BO | 3 | OUTBOUND | TRANSFORMED |
| DB43 | 2014-03-05 17:03:00.101 | SB4 | BI | BO | 3 | OUTBOUND | TRANSFORMED |
| DB5 | 2014-03-05 17:07:00.101 | SB5 | BI | AO | 1 | OUTBOUND | TRANSFORMED |
| DB41 | 2014-03-05 17:03:00.101 | SB4 | BI | AO | 3 | OUTBOUND | TRANSFORMED |

FIG. 8F

HIGH PERFORMANCE ERP SYSTEM ENSURING DESIRED DELIVERY SEQUENCING OF OUTPUT MESSAGES

RELATED APPLICATION AND PRIORITY CLAIM

The present disclosure claims priority from U.S. Provisional Patent Application having the same title as the subject patent application, assigned Application No. 61/968,382, Filed on: 21 Mar. 2014, and is incorporated in its entirety into the present application, to the extent not inconsistent with the disclosure herein.

BACKGROUND OF THE DISCLOSURE

Technical Field

The present disclosure relates to ERP (enterprise resource planning) systems and more specifically to ensuring desired delivery sequencing of output messages.

Related Art

ERP systems are often used to coordinate the activities of different parts of an enterprise or among enterprises (generally referred to as different 'components' of an enterprise, as viewed from the perspective of operation of ERP systems). ERP systems are used in wide variety of functional areas such as hospitals, manufacturing, offices, inventory management, etc., as is well known in the relevant art.

Messages are typically used for electronic coordination of various activities in different components of an enterprise. Thus, an ERP system may receive input messages from different components, process the input messages to generate output messages, and deliver the messages to corresponding components for appropriate action.

For example, in the case of a hospital, upon admission of a patient for a specific ailment, an input message may indicate the information on a patient including the details of identity of the patient and ailment details. An ERP system may process the input message to deliver multiple output messages, one requiring a bed for the patient, another ordering a blood test for the patient, etc. Such output messages are delivered to the corresponding departments of the hospital.

ERP systems are required to be implemented while meeting the requirements of corresponding environments. One common requirement is 'high performance', implying providing a higher throughput performance in generating output messages corresponding to the input messages. There is often a need to ensure a desired delivery sequencing of output messages.

Aspects of the present disclosure address such requirements, as described below with examples.

BRIEF DESCRIPTION OF THE DRAWINGS

Example embodiments of the present disclosure will be described with reference to the accompanying drawings briefly described below.

FIGS. 7A-7G depict the content of a table at corresponding time instances, illustrating the manner in which desired output sequencing is obtained in an embodiment.

FIGS. 8A-8F depict the content of a table at corresponding time instances, illustrating the manner in which multicast messages are processed in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An embodiment of the present disclosure receives a respective set of input messages from a corresponding one of multiple source systems, with the messages of each set of input messages being received in a corresponding chronological (time) order. The input messages are processed using parallel processing approaches to generate corresponding output messages, with each output message being generated for delivery to a corresponding destination system. The destination system for each output message is identified only during such processing of the input messages. The output messages are queued and an output message to a destination system is transmitted only after output messages of all prior input messages from the same source system to the destination system are transmitted, while permitting output messages generated by processing of input messages from different source systems being permitted to be transmitted out-of-sequence.

According to another aspect, when processing of a single input message causes generation of multiple output messages (multicast case), each such output message is permitted to be transmitted only after all of the output messages are also available for transmission, irrespective of the destination system to which such messages are eventually sent to. Each multicast output destined to a corresponding destination system is required to satisfy the sequencing requirement that output messages of input messages received earlier than the multicast input message, and destined to the same destination system, are required to be transmitted earlier that the multicast output message.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
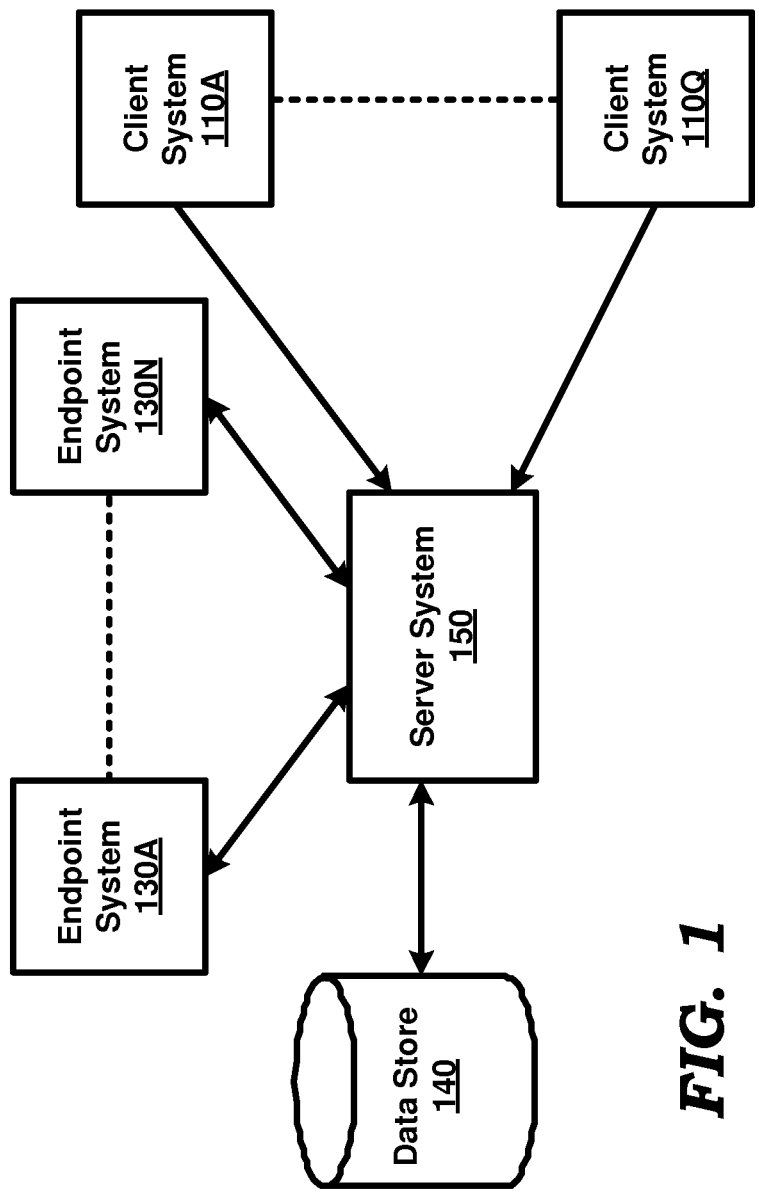
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing client systems 110A-Q, endpoint systems 130A-130N, data store 140 and server system 150.

Merely for illustration, only representative number/type of systems is shown in FIG. 1. Many environments often contain many more systems, both in number and type, depending on the purpose for which the environment is designed. Furthermore, though the blocks are shown connected pair wise to depict corresponding flows, the blocks may be connected by a suitable network (not shown). Each block of FIG. 1 is described below in further detail.

The environment is assumed to be a hospital, in which server system 150 operates as a coordination (ERP) system of activities of various departments of the hospital. Server system 150 receives input messages from various sources and processes each of the received messages to generate output messages to corresponding destinations. Each output message may specify the corresponding required action (or general information) at the corresponding destination. As described below, the input and output messages support the various required workflows within a hospital.

Data store 140 represents a non-volatile (persistent) storage facilitating storage and retrieval of data by applications executing in server system 150. For purpose of illustration, it is assumed that data store 140 has available thereon various data generated, for example, due to the execution of such applications processing input messages. Data store 140 may be implemented as a corresponding database server using relational database technologies and accordingly provide storage and retrieval of data using structured queries such as SQL (Structured Query Language). Alternatively, data store 140 may be implemented as a corresponding file server providing storage and retrieval of data in the form of files organized as one or more directories, as is well known in the relevant arts.

Endpoint systems 130A-130N are digital processing systems at corresponding departments, which act upon various output messages. For example, one endpoint system 130A may correspond to a laboratory, which performs a specific test upon receipt of corresponding output messages. Another endpoint system 130N may correspond to a pharmacy, which delivers medicines to specific patients, upon receipt of corresponding output messages. In addition, each endpoint system may provide input messages, which cause server system 150 to generate additional output messages for respective endpoint systems.

Client systems 110A-110Q represent systems such as personal computers or smart-phones, using which hospital personnel can provide various inputs. Client systems 110A-110Q are thus assumed to provide various input messages to server system 150, but are not recipients of output messages generated by server system 150.

It may be thus be appreciated that input messages originate at endpoints and client systems, which are together termed as source systems. On the other hand, the endpoint systems operating as destinations for output messages are termed as destination systems.

According to an aspect of the present invention, server system 150 is implemented to process several input messages in parallel (concurrently). However, due to such parallel processing, output messages may be generated in unpredictable sequence in server system 150.

However, in several environments, it may be desirable that the output messages to any destination system be delivered in the same sequence as that corresponding to the respective input messages from the same source. For example, in healthcare systems such as hospitals, the order of message are critical for the receiving endpoints to be able to process them accordingly. For example, the order of tests specified to a laboratory might be critical and should be maintained, but since the origin of such dependent messages happen from the same source it is sufficient if one ensures that the sequencing is maintained in messages transmitted between each pair of endpoints.

Aspects of the preset disclosure provide for both the concurrent processing and the desired sequencing. More formally stated, assuming a sequence of k input messages $\{i1, i2, \ldots ik\}$ are received from a same source, and server system 150 causes generation of respective output messages $\{o1, o2, \ldots ok\}$ to a same destination, any message op (p being any integer from 2 to k) can be delivered (transmitted) to that destination only after all messages oq (q being integer from 1 to (p−1)) are delivered. Output messages generated earlier in the sequence are blocked until such a requirement can be met, as described below in further detail.

3. Processing Input Messages

Figure 2:
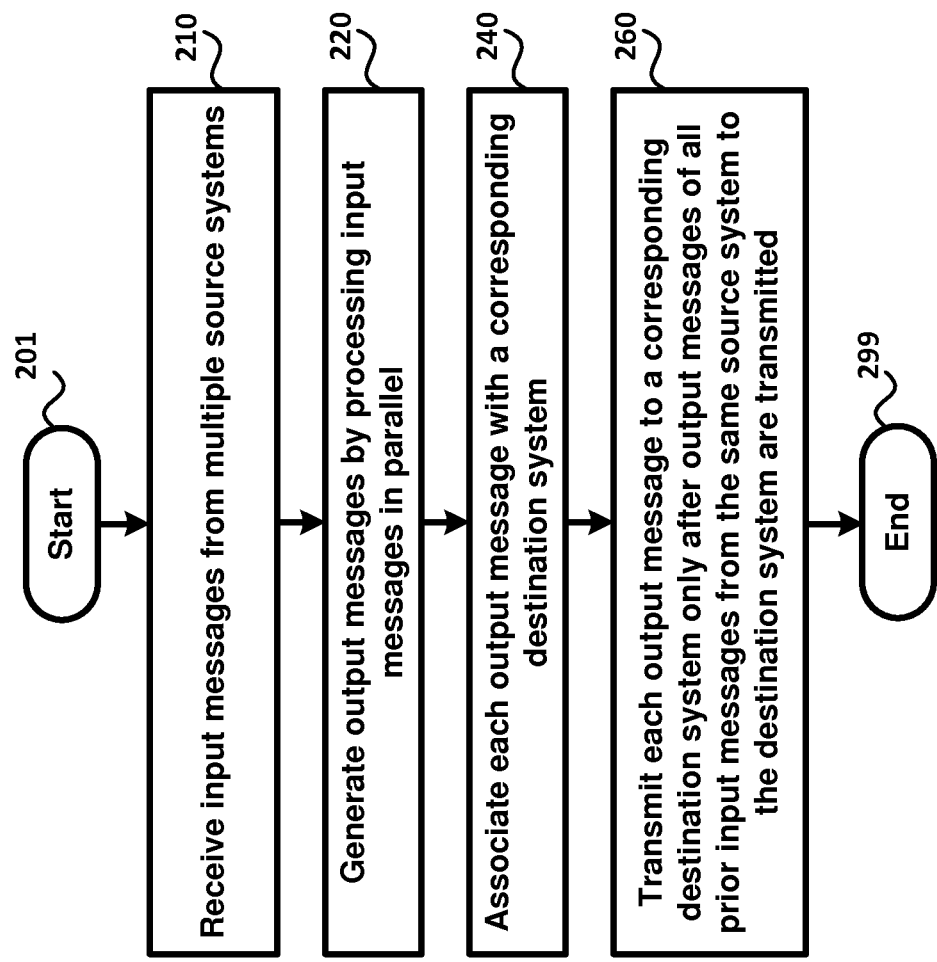
FIG. 2 is a flow chart illustrating the manner in which input messages are processed according to an aspect of the present disclosure.

FIG. 2 is a flow chart illustrating the manner in which input messages are processed according to an aspect of the present disclosure. The steps of the flowchart are described with respect to FIGS. 1 and 2 merely for illustration. However, the features can be implemented in other systems and environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, server system 150 receives input messages from multiple source systems. For illustration, it is assumed that input messages are identified as Mjk, wherein j represents a corresponding source system and k an integer indicating the position in the sequence of arrival of the input messages from the corresponding source. Thus, M11, M12, M13, etc., represent the sequence of messages received from the same source system 1.

In step 220, server system 150 generates output messages by processing input messages in parallel. Due to such parallel/concurrent processing, the output messages may be generated in any sequence (asynchronously), depending on the processing resources allocated to the corresponding concurrent executing entities processing the input messages.

For example, output messages corresponding to later received input messages (from same or different source systems) may be generated earlier (in time scale or chronological order) compared to those corresponding to earlier received input messages. Alternatively, the output messages may be generated matching the chronological sequence in which the input messages are received. As the sequence/order in which the output messages are generated (in general when the messages become available) is not known apriori, the output messages are said to be generated (become available) asynchronously.

In step 240, server system 150 associates each output message with a corresponding destination system. It may be appreciated that processing of each input message may cause generation of one or more output messages, each for a corresponding destination. For example, if an input message indicates that a patient is admitted with a specific condition, server system 150 may generate one output message (to facilities management department) indicating that the patient needs to be allocated a bed and another output message (to the laboratory) indicating that blood tests to be performed.

It may be appreciated that the specific set of output messages and the corresponding destinations are known only by processing of the corresponding input message. The messages to each destination system may be logically organized in a corresponding queue.

In step 260, server system 150 transmits (and thus causes to be delievered) each output message to a corresponding destination system only after output messages of all prior input messages from the same source system to the destination system are transmitted. In other words, an output message (generated by processing of a given input message received from a given source system) in a queue is transmitted only after confirming transmission of all the output messages generated by processing of all input messages received prior to the given message from the given/same source system.

In other words, if input messages are received from different sources, the corresponding output messages can be transmitted in any order, whether or not the output messages are destined for the same or different destination system.

In addition, if input messages from a same source cause output messages to different destination systems, the output messages can be transmitted in any order (in case of unicast messages, as described in sections below). The flowchart ends in step 299.

By thus employing parallel processing techniques and permitting delivery of output messages as soon as possible, the efficiency of operation of the entire hospital is enhanced. At the same time, by blocking messages in accordance with the requirement of step 250, the requisite integrity in treating patients is obtained. While the description is provided with respect to hospitals merely for illustration, embodiments in accordance with the present disclosure can be implemented in other contexts having similar sequencing and throughput performance requirements.

The description is continued with respect to the details of server system 150 in an embodiment.

4. Server System

Figure 3:
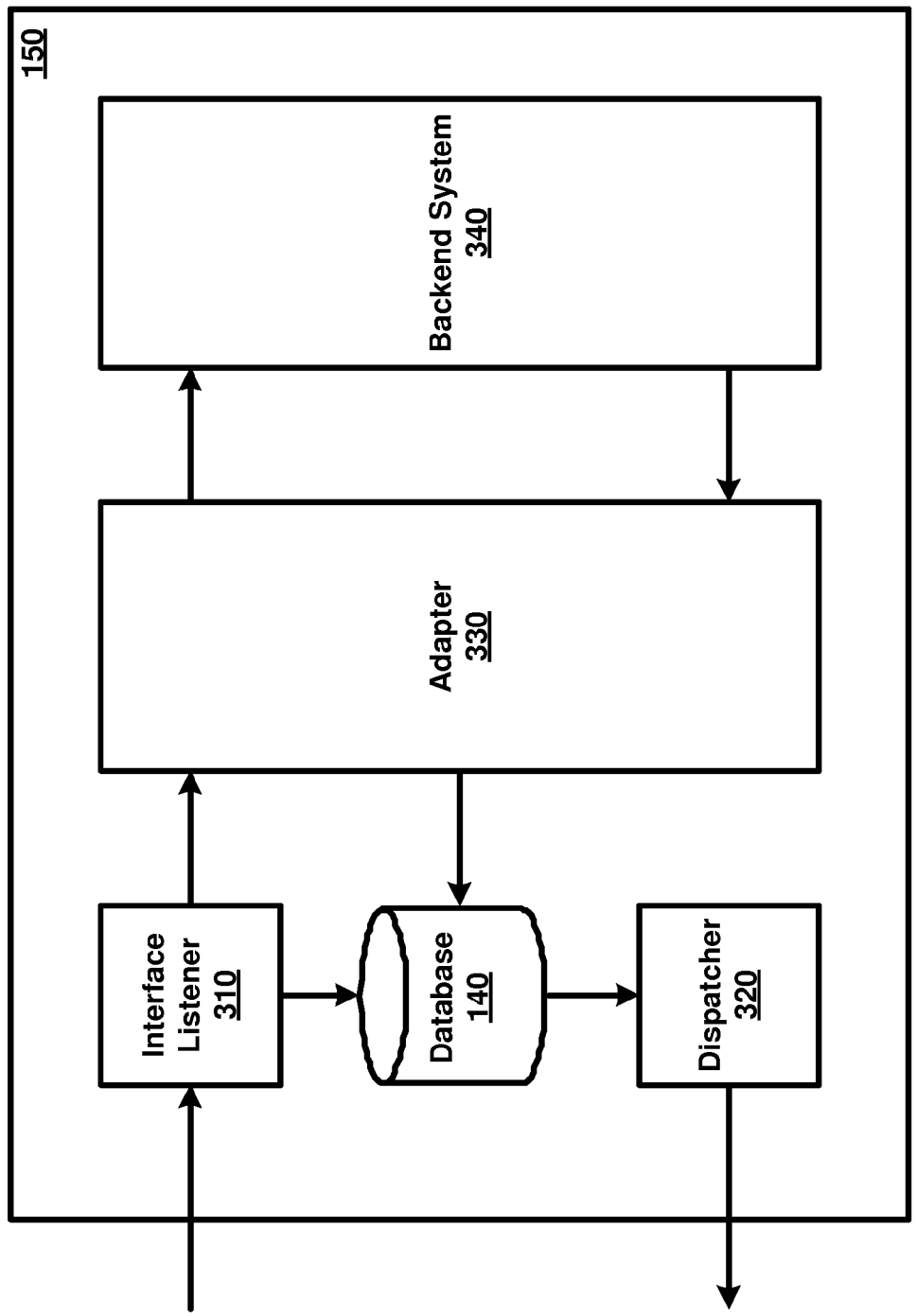
FIG. 3 is a block diagram illustrating the details of a server system in an embodiment.

FIG. 3 is a block diagram illustrating the details of server system 150 in an embodiment. Server system 150 is shown containing interface listener 310, dispatcher 320, adapter 330, and backend system 340. Database system 140 is also shown as being integral to server system 150. Each block is described below in further detail.

Interface listener 310 receives input messages from various source systems. For each input message, a corresponding record is inserted in database 140. As may be appreciated the record is updated at various stages of processing of the input message.

Adapter 330 receives messages from interface listener 310 and transforms each message from a native format (e.g., Health Level 7 standard) to XML format, as suitable for further processing by backend system 340. The transformed input message is forwarded to backend system 340.

Similarly, upon receiving output messages in XML format from backend system 340, each message is transformed (by adapter 330) back into native format before storing such output messages in database 140. Adapter 330 further updates the status of the input/output messages, as being ready for delivery/transmission, in the corresponding records in database 140.

Backend system 340 processes each input message received in XML format and generates corresponding output messages. In an embodiment, the processing of each input message can generate multiple messages. Such multiple messages generated from processing of a single input message, are viewed as a multicast output message, with the number of output messages being referred to as a fan-out count (unicast case corresponding to a fan-out count of 1).

It may be appreciated that the destination of each output message may be determined by/during the processing of the input message by backend system 340. In other words, the destination is not known when the input message is received at interface listener 310.

Database 140 stores records indicating the status of processing of various input messages and corresponding output messages. The data in database 140 may indicate whether the output messages corresponding to each input message are generated or not (in general, the status of processing of each message). In addition, database 140 may store the output messages that are to be transmitted also. Database 140 can be external to server system 150, as depicted in FIG. 1.

Dispatcher 320, provided according to an aspect of the present disclosure, examines the records in database system 140 and determines when to transmit each output message. The messages are transmitted in accordance with step 260 described above. The operation of dispatcher 320 is described below with several examples below.

5. Dispatcher

Figure 4:
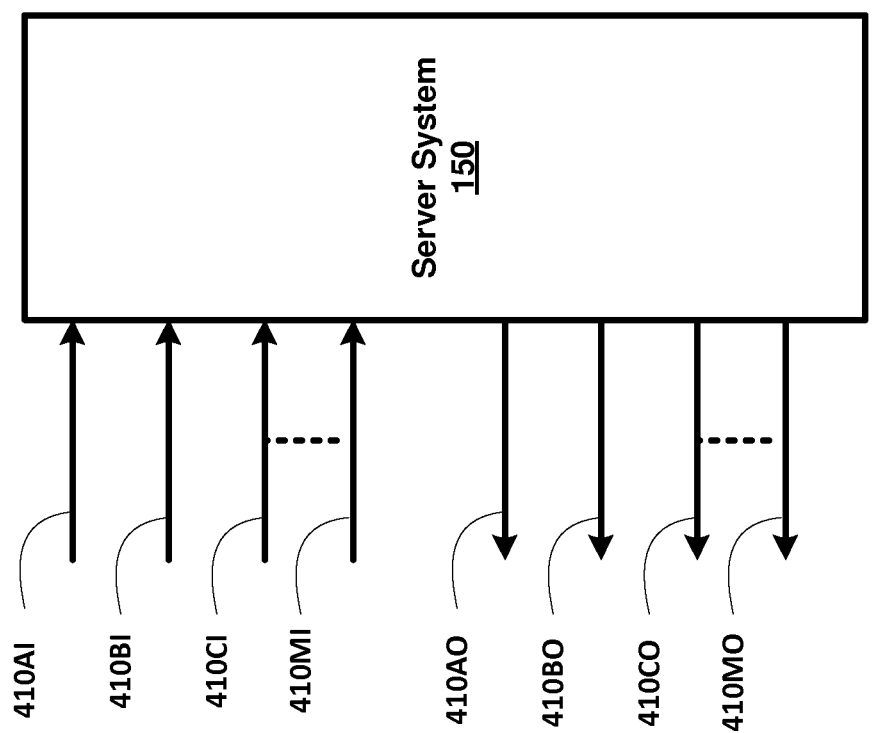
FIG. 4 is a block diagram illustrating the input streams and output streams in relation to a server system in an embodiment.

FIG. 4 is a block diagram used for logically illustrating the operation of dispatcher 320 in one embodiment. The diagram shows N input streams 410AI-410MI and N output streams 410AO-410MO. Each input stream corresponds to a source system/component and each output stream corresponds to one destination system/component. Assuming for simplicity that each system has a corresponding input stream and a corresponding output stream (with some streams potentially being NULL or zero entries), it may be assumed that there are M end point systems (A to M), which send input messages on a corresponding input stream, and receive output messages on a corresponding output stream.

Each output stream may be viewed as having corresponding independent queues, each for a corresponding output message corresponding to input messages from one of the source systems. Thus, the stream of output messages ready for transmission on output stream 410AO are earlier formed from processing of input messages received only on input streams 410AI and 410BI, may be viewed as having two independent queues. As described below with illustrations, the messages across different queues can be transmitted independently, while sequencing of step 250 is enforced within each queue.

Figure 5:
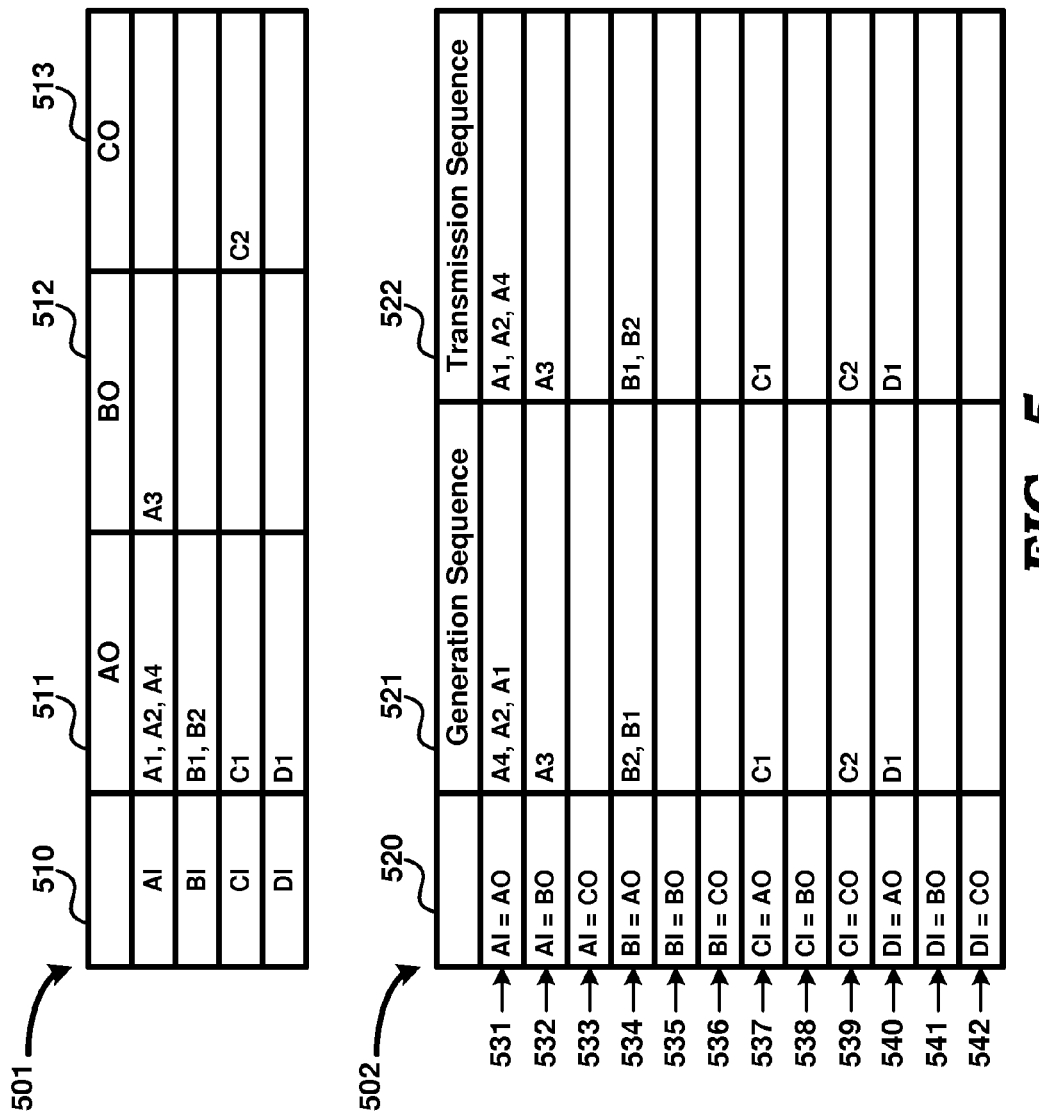
FIG. 5 contains tables illustrating the blocking/transmission of output messages for a desired output sequencing, in an embodiment.

FIG. 5 depicts a first use case of operation, in which input messages A1, A2, B1, B2, A3, C1, A4, C2, D1, are assumed to be received by interface listener 310, in that sequence (A1 first and D1 last) or chronological order. Table 501 depicts the output messages generated and the corresponding destination for each of the received messages (assuming a one to one correspondence between input messages and output messages). Column 510 indicates the source system from which the input messages are received. Columns 511-513 depict the output messages generated for transmission to the corresponding specific destination system.

Merely for ease of understanding, the output messages are also shown with the same labels A1, A2, B1, B2, A3, C1, A4, C2, D1, but shown associated with the corresponding destination system. Thus, on output stream destined to A, output messages A1, A2, A4, B1, B2, C1, and D1 are shown. Thus the same label A1 is used to denote the input message received from A, and also the output message resulting from processing of such input message. The destination of each output message is shown in the corresponding column label (e.g., output message A3, generated processing of input message A3 received from AI, is outbound on BO).

It may be appreciated that these output messages can be generated (in general available for transmission) in any sequence. In other words, the output message corresponding to A2 may be available ahead of A1, etc., though the corresponding input messages are received in a different order (i.e., A2 received after A1).

Table 502 depicts the sequence in which the output messages are generated (521) and the sequence of transmission (522) thereafter. Each row (531-542) corresponds to a combination of one input stream and one output stream, as indicated in column 520. For example, row 532 indicates the messages transmitted on the queue corresponding to destination system B (BO), for messages received on the input stream corresponding to source system A. As noted above, dispatcher 320 ensures a desired (transmission) sequencing within each such queue, as described below in further detail. However, the output messages destined for each destination may be maintained as a single queue.

Row 531 depicts that transmission of A2 is blocked until A1 is transmitted, and that A4 is blocked until A1 and A2 are transmitted. That is, the row shows a generation sequence of A4, A2 and A1 (in that order), while the transmission sequence is shown to be A1, A2 and A4, being identical to the sequence in which the corresponding input messages are received. Similarly, row 534 depicts that the generation order is B2 and B1, while the transmission order is B1 and B2.

However, it should be appreciated that dispatcher 320 may transmit A3 ahead of A1 or A2, or even after A4, since the output message corresponding to A3 is being transmitted to a different destination system (B). Similarly, message B1 may be transmitted ahead of A1 or after A4, since the messages in each queue are transmitted independently. As another illustration, C2 may be transmitted ahead of C1, as the destinations are different.

It may be appreciated that the above use case illustrates a scenario in which backend system 340 generates a single output message in processing each input message. However, there are scenarios in which processing of a single message may cause generation of multiple output messages (referred to as a multicast scenario). The manner in which such messages are processed is described below in further detail.

6. Multicast Messages

Figure 6:
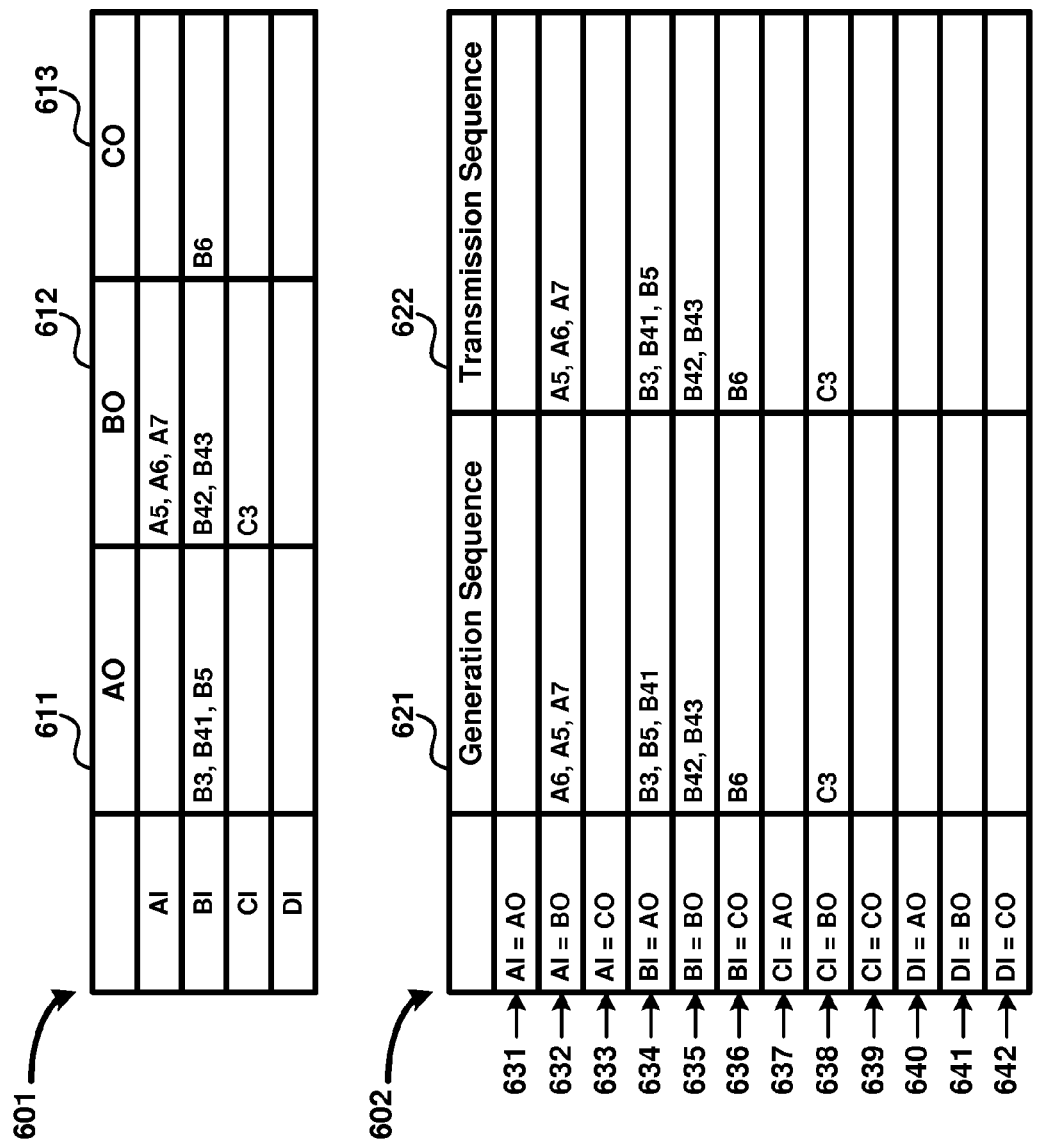
FIG. 6 contains tables illustrating the blocking/transmission of output messages for a desired output sequencing in a multicast scenario, in an embodiment.

FIG. 6 depicts a second use case of operation, in which input messages A5, B3, B4, A6, A7, C3, B5, are assumed to be received by interface listener 310, in that sequence (A5 first and B5 last). Tables 601 and 602 are shown with similar conventions as those explained above for tables 501 and 502 respectively.

Table 601 depicts the output messages generated by processing of the input messages, and the corresponding destination for each of the received messages (assuming a one to one correspondence between input messages and output messages). Again, as described above, merely for ease of understanding, the output messages are also shown with the same labels as those for the input messages (in the case of unicast messages).

However, backend system 340 is assumed to have generated three output messages B41-B43 by processing input message B4 received from source system B. Each of the messages B41-B43 is referred to as "multicast element" and the input message B4 is referred to as multicast input.

Thus, output messages on output stream destined to A (column 611) are shown containing B3, B41, B5. The output messages to destination system B (column 612) are shown containing A5, A6, A7, B42, B43, and C3. It may be appreciated that these output messages can be generated in any sequence. In other words, the output message corresponding to A7 may be available ahead of A5, etc., though the corresponding input messages are received in a different order.

Table 602 depicts the sequence in which the output messages are generated (621) and the sequence of transmission (622) thereafter, as relevant to each combination of source system and destination system (column 620), in an example scenario. Each row (631-642) corresponds to a combination of one input stream and one output stream. As noted above, dispatcher 320 ensures a desired (transmission) sequencing within each such queue, as described below in further detail.

In particular, according to an aspect of the present disclosure, none of the multicast elements is transmitted until all of the multicast elements (corresponding to the source multicast input) are generated and available in the output queue. Thus, none of multicast elements B41, B42 and B43 is transmitted until all three are generated and available in data store 140. In other words, the two messages are blocked from transmission until the third one is also available for transmission. The output messages subsequent to such blocked messages are also blocked, to obtain the desired transmission sequence.

With respect to the queue of row 634, B41 is not considered ready for transmission until other two output messages B42 and B43 are also generated and available for transmission (i.e., generated and placed in the corresponding output queue). In addition, B41 is transmitted only after B3 is transmitted, as described above with respect to FIG. 5 (since input message B4 is received after input message B3). Furthermore, the multicast elements B42 and B43 of row 635 are transmitted in any order (though shown matching the generation order) once B41 is also generated and is available in data store 140.

As also described above with respect to FIG. 5, the output messages of rows 631-633 and 637-642 can be generated before, after or interspersed with the messages of row 634, since the messages in each queue/row of table 602 are transmitted independently (and there are no constraints due to the multicast feature as well).

In addition, it should be appreciated that dispatcher 320 may transmit B6 ahead of B3 or B41, or even after B5, since the output message corresponding to B6 is being transmitted to a different destination system (B) and B6 is not generated by the processing of multicast message B4. However, B5 and B6 are ready for transmission only after B41, B42 and B43 are all generated and available for transmission in the corresponding queues.

The above noted, sequencing can be realized by various approaches and techniques, as will be apparent to one skilled in the relevant arts by reading the disclosure provided herein. An example implementation is described below in further detail.

7. Example Data Structure

FIGS. 7A-7G depict the content of a table (maintained in database 140) at respective ones of successive time instances. Each row there corresponds to one of the input or output messages. The columns are described below briefly.

Message identifier 711 is a global unique identifier assigned to each message (by interface listener as the corresponding input message is received). As an extension to the conventions used above, each input message is prefixed with S (source) and each output message is prefixed with D (destination). Thus the input message corresponding to message A2 described above is referred to as SA2 and the output message generated by processing message A2 is referred to as DA2. In case of multicast, a double suffix is used for the output messages, with the first character matching the number in the input message identifier and the second character used to distinguish among the multiple multicast elements.

Sort field 712 is used for enforcing the transmission sequencing described above. In an embodiment described below, each input message is marked with a time stamp (globally consistent in server system 150) at which the input message is received, and the same time stamp is copied to the output message(s) generated by processing of the input message (e.g., rows 741 and 727 have same time stamp; rows 724 and 742 have the same time stamp). Thus, when the table is sorted by source system and sort field, the output messages are grouped with the corresponding input message in the sort order.

Input (message) identifier 713 stores a valid value only when the message of the corresponding row stores information for an output message. In that case, the field is set to the message identifier of the input message from which the output message is generated. Thus, when input identifier 713 is shown blank, the corresponding rows (e.g., 721-729) store information related to input messages.

Source system 714 identifies the source system for the inbound message. In case of output messages, the field indicates the source system from which the corresponding input message (the processing of which caused generation of the output message) has been received. Each source system is conveniently shown represented by the same labels used in FIGS. 5 and 6.

Destination system 715 identifies the destination/target system for the output messages. A value of NULL (shown as blank) may be stored in case of inbound messages.

Group Count 716 number of output messages generated by the processing of the corresponding input message. Thus, the value is 1 in case of unicast messages and greater than one for each multicast message. The value is set by backend system 340 as equaling the multicast count determined during processing of the input message, and the same count value is used for all the multi-cast elements. The field is unused in case of input messages.

Direction 717 indicates whether the row stores an input message (inbound) or an output message (outbound), in addition to indicating whether an outbound message is ready for transmission. Thus, a label/value INBOUND for a row indicates that the message in the row corresponds to an input message. A label INTERFACE_OUTBOUND is used for output messages upon the corresponding message being created/formed. The label for an output message is changed to OUTBOUND when the output message is ready for transmission according to the sequencing requirement described herein.

State 718 indicates status of processing of each message. The status value is updated as the processing of an input message and output message progresses. The status/state of each input message can be one of (A) PROCESSING, (B) ROUTING, and (C) QUEUED, while the state of each output message can be one of (D) GENERATED and (E) TRANSFORMED. Each state is described below.

Thus, when an input message is received, interface listener 310 creates a row in the table, generates message identifier, sort field, source system, direction and status fields (PROCESSING state).

When adapter 330 forwards the input message to backend system 340, adapter 330 updates the state field to ROUTING, implying that the input message is being processed. After backend system 340 generates an output message, adapter 330 updates the status of the input message to QUEUED (even in the case of multicast message, upon generation of the first output message).

A new entry is created for each generated output message and adapter 330 marks the status of the output message as GENERATED. The columns 711-718 are set suitably for the output message, as described above. Upon adapter 330 completing any needed transformations, adapter 330 updates the status of output message to TRANSFORMED. Thus, a TRANSFORMED state implies the output message is available for transmission. When the output sequencing requirement noted above in step 260 is satisfied, the message is deemed to be 'ready' for transmission.

As noted above, when the output sequencing requirement is also met, direction 717 is set to OUTBOUND (indicating the output message is ready for transmission).

In case of multicast messages, the group count 716 of an output message is set to indicate the number of multicast output elements that would be generated. Such information is normally available as backend system 340 generates the first multicast element (even if the later ones take substantial additional time to generate), and accordingly group count 716 for all the multicast elements may be set to the same value.

Now continuing with the operational example in relation to FIG. 7A, the table is shown assuming all the input messages of use cases FIGS. 5 and 6 are received and forwarded to backend system 340. It is further assumed that all these messages are delivered to backend system 340 and thus state 718 is initially set to PROCESSING and then changed to ROUTING, as shown.

FIG. 7B depicts status of the table illustrating availability of some of the generated output messages prior to transformation. In comparison to FIG. 7A, rows 741-746 are shown storing information corresponding to output messages DA4, DB2, DA3, DA2, DC2 and DD1, in that order. Group count 716 indicates that each of the output messages corresponds to a unicast case. The group count information is received as a part of header (from backend system 340) and populated (by adapter 330) in the corresponding output rows upon the row being created.

The output messages are shown linked to corresponding input messages by input identifier 713, and the state 718 of the corresponding rows of the input messages is shown changed to QUEUED. In addition, each output message is stored with status of 'GENERATED', indicating that the output messages are generated and need to be transformed.

In particular, output messages corresponding to input messages SA1, SB1 and SC1 are not yet generated (with corresponding state 718 still remaining in ROUTING) and thus no corresponding entries are shown for any related output messages.

FIG. 7C depicts the status of the table after some of the output messages are transformed, and thus available for transmission, subject to the sequencing requirement. Thus, in comparison to FIG. 7C, state 718 of rows 741-746 is shown changed to TRANSFORMED.

While FIGS. 7A-7C are shown at different time instances, it may be appreciated that a background process queries database 140 periodically/frequently to identify the output messages that are ready for transmission, including satisfying the sequencing requirement noted above. Direction 717 of such rows are immediately marked as OUTBOUND, implying that the output message is ready for transmission. The corresponding input messages are removed.

The corresponding SQL queries are shown in Appendix (including for the multicast case described below). As may be readily observed from the Appendix, there are four queries. The first query (Q1) operates to select the minimum timestamp value (sort column value) for each distinct target (source system) which does not satisfy the group count condition (i.e does not satisfy the condition for migrating from Available to Ready state) The second query (Q2) operates on the output of first query (Q1) to mark as 'OUTBOUND' those messages that are ready for transmission. Records to be updated are identified based on the condition of the timestamp of the record being less than the output value of the first query for the given source system The third query (Q3) is used for deleting the rows of the input messages, once the corresponding output messages are marked with a direction of OUTBOUND.

The fourth query (Q4) is used by dispatcher 320 to sort the OUTBOUND messages by the time stamp of sort field 712. The messages are transmitted according to the sorted order. It is thus assumed there is one dispatcher which sequentially transmits the output messages for all of the destination systems. However, additional level of parallelism can be obtained by using corresponding dispatchers for each destination system.

Thus, when dispatcher 320 executes/applies the queries as against the data of FIG. 7C, output sets corresponding to BO and CO are empty/NULL, while output set corresponding to AO will be {DD1}. The result of execution of the queries Q1-Q3 is shown FIG. 7D.

As a result, output messages of rows 744, 743 and 741 would be continued to be blocked (not included in the corresponding output sets of AO/BO) from transmission since input message corresponding to row 721 does not have its output messages generated yet. Similarly, output message DB2 of row 742 is blocked from transmission since input message corresponding to row 723 is in ROUTING state also. Row 726 blocks transmission of output message of row 745 for similar reason. The output message corresponding to row 746 is therefore ready for transmission.

However, in case output messages are available to be transmitted on multiple destination streams, dispatcher 320 may be implemented to send the output sets in parallel using corresponding concurrently executing threads. That is, one concurrent thread can send sequentially (in the same order as shown by sort field) the output messages for one destination, while another concurrent thread can send sequentially the output messages for another destination. Thus, the output message DD1 is transmitted to destination system AO. It is assumed that each output message is removed from the corresponding table on transmission, though alternative embodiments can be implemented to mark the message with a corresponding status and effect removal in batch mode later.

FIG. 7E depicts the status of the table with row 746 (of transmitted message) removed, and rows 747-749 added corresponding to the three generated/transformed output messages DB1, DC1 and DA1 (since the status shown in FIG. 7D). Rows 747 and 748 are shown with the output messages in TRANSFORMED status. Row 749 is shown with the state of GENERATED only, and thus the corresponding output message is awaiting completion of transformation. All the added messages are shown with direction 717 set to INTERFACE_OUTBOUND.

Assuming the above noted query Q1 is executed on the table of FIG. 7E, an output set of {DB1, DB2, DC1} is identified for AO, {DA3} for BO, and {DC2} for CO. Direction 717 of the corresponding rows is shown set to OUTBOUND (by execution of Q2) in FIG. 7F. The input messages (rows 723-726 and 728) corresponding to the output messages changed to OUTBOUND, are also absent (in comparison to FIG. 7E) in view of their removal (by execution of Q3).

It may be observed that DA3 is transmitted ahead of DA1, even though the input message SA1 is received prior to input messages SA3, since the destination of DA1 is different from the destinations of DA3. DA4 and DA2 (in TRANSFORMED state) are blocked from transmission as DA1 is not ready for transmission (as being in GENERATED state only). The five rows corresponding to the five transmitted output messages are accordingly removed (by execution of Q3).

FIG. 7G depicts a situation after DA1 is shown in a transformed state and the queries Q1-Q3 of Appendix is executed. Rows 721, 722 and 727 (storing input messages SA1, SA2 and SA4) are removed. All the three output messages there are shown ready for transmission to AO. Thus, all output messages corresponding to the unicast case are shown in OUTBOUND direction (ready for transmission), while meeting the sequencing requirement explained above. The description is continued with respect to multicast case now.

FIGS. 8A-8F depict the status of a table in database 140 at respective ones of successive time instances, illustrating the multicast case. FIG. 8A shows the eight input messages of FIG. 6 stored in corresponding rows 831-838. The columns are shown with content consistent with the conventions described above. The messages are shown in ROUTING state. It is assumed that the output messages corresponding to all the input messages, except one of the three unicast messages for message SB4, are generated. The corresponding table is shown in FIG. 8B.

FIG. 8B depicts that all the output messages as being generated and stored, except that only two of the three multicast elements of SB4 are shown generated and stored. Multicast elements DB42 and DB43 (row 853 and 854) are shown with a group count of 3, indicating that 3 multicast elements would be generated for the corresponding input message SB4. The remaining messages are shown with group count of 1. In addition, each output message is stored with status of 'GENERATED', indicating that the output messages are generated and need to be transformed and direction 817 as INTERFACE_OUTBOUND.

FIG. 8C depicts that all the output messages are transformed and state 818 changes to TRANSFORMED. When the query Q1 of the Appendix is executed on the table of FIG. 8C, dispatcher 340 receives as output set {A5-A7, C3} and {B3} for BO and AO respectively, while null set is received for CO. It may be observed that B42 and B43 are blocked as the third multicast element is not yet ready for transmission (since the third message is not yet generated). SB4 is shown blocking B5 and B6 (since the source system is the same for the three messages and the third multicast element is not yet generated).

The state upon completion of execution of the queries Q2-Q3 is shown in FIG. 8D. The rows corresponding to each element of the above noted output sets are shown marked as OUTBOUND. In addition, corresponding input rows 831, 834-836 are shown removed.

FIG. 8E depicts that the status of the table after third multicast element B41 is generated and the queries Q1-Q3 of the Appendix are thereafter executed. Thus newly generated row 860 is shown having multicast element DB41, with State as GENERATED. As a result of the execution of query Q2 row 859 is marked as OUTBOUND (ready for transmission). Upon execution of query Q3 the corresponding input row 838 is removed.

Thus, B6 is transmitted to CO, without having to wait for B41 to be transformed, since the messages are for different destinations. B5 continues to be blocked as having the same destination as B41. B42 and B42 are also blocked as B41 is not yet transformed.

FIG. 8F depicts that B41 is transformed and when the queries Q1-Q3 are thereafter executed, all four messages are marked with OUTBOUND for direction 817, and corresponding input rows 833 and 837 are shown removed. Thus, all the four messages are transmitted to their respective destinations, but with sort field determining the sequence/order of transmission for each destination, as shown with respect to query Q4.

In view of the output sequencing thus maintained, the requirements of hospitals type environments (requiring such sequencing) is met. In addition, as parallelism is permitted in the intermediate stages of processing of messages (up to arrival at the dispatcher), higher throughput performance may be readily obtained. As output messages are transmitted as soon as there is no violation of the sequencing constraint, such messages are available at the respective destinations quickly.

It should be further appreciated that the features described above can be implemented in various embodiments as a desired combination of one or more of hardware, executable modules, and firmware. The description is continued with respect to an embodiment in which various features are operative when the software instructions described above are executed.

8. Digital Processing System

Figure 9:
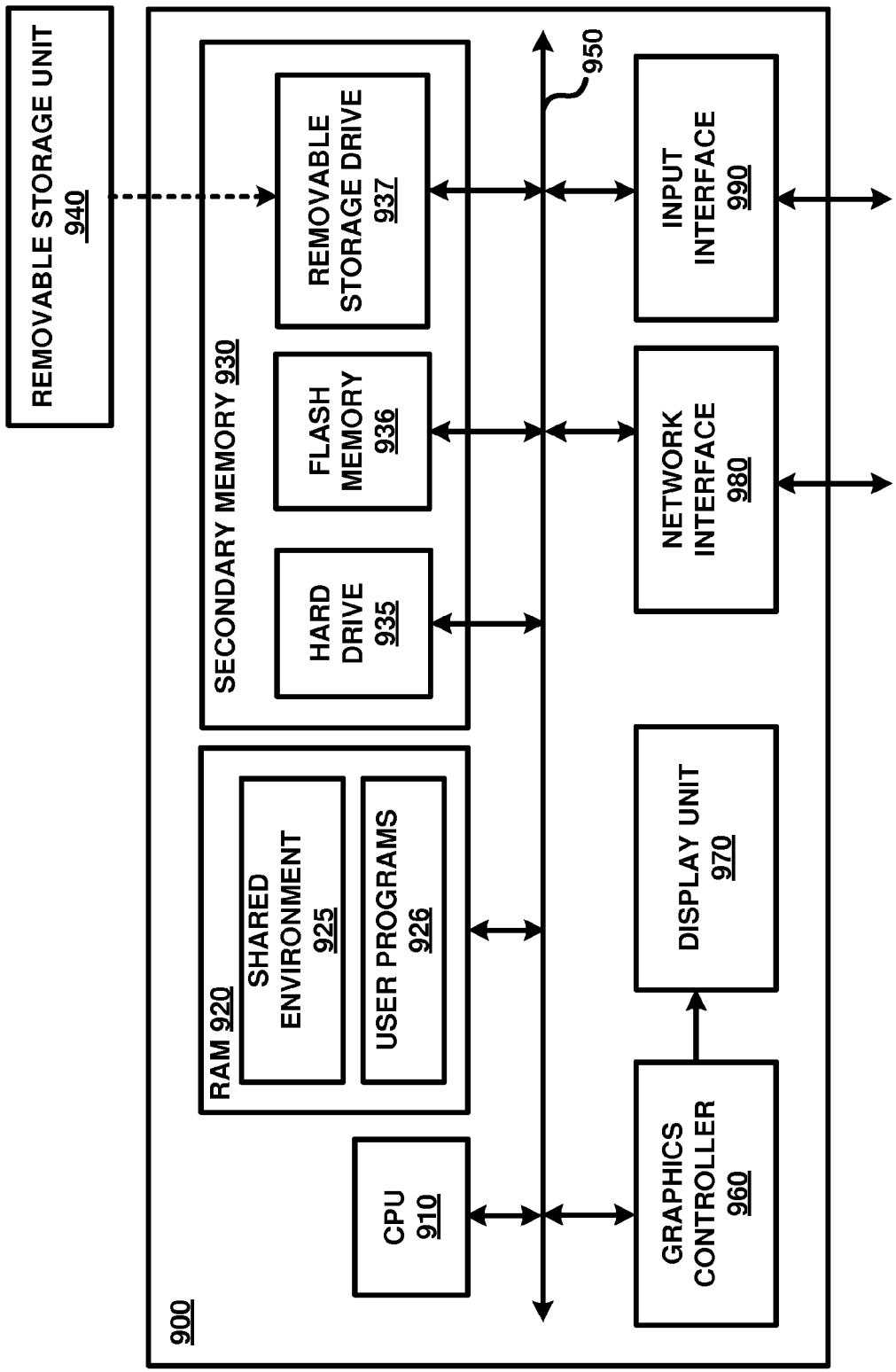
FIG. 9 is a block diagram illustrating the details of a digital processing system in which several aspects of the present invention are operative by execution of appropriate software instructions.

FIG. 9 is a block diagram illustrating the details of digital processing system 900 in which various aspects of the present disclosure are operative by execution of appropriate software instructions. Digital processing system 900 may correspond to server system 150 (or any other system in which the various features disclosed above can be implemented).

Digital processing system 900 may contain one or more processors such as a central processing unit (CPU) 910, random access memory (RAM) 920, secondary memory 927, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or user programs 926. Shared environment 925 includes operating systems, device drivers, virtual machines, etc., which provide a (common) run time environment for execution of user programs 926.

Graphics controller 960 generates display signals (e.g., in RGB format) to display unit 970 based on data/instructions received from CPU 910. Display unit 970 contains a display screen to display the images (e.g., those the display screens depicted above) defined by the display signals. Input interface 990 may correspond to a keyboard and a pointing device (e.g., touch-pad, mouse) and may be used to provide inputs. Network interface 980 provides connectivity to a network (e.g., using Internet Protocol), and may be used to communicate with other systems (such as those shown in FIG. 1) connected to the network.

Secondary memory 930 may contain hard drive 935, flash memory 936, and removable storage drive 937. Secondary memory 930 may store the data software instructions (e.g., for performing the actions noted above with respect to FIG. 2), which enable digital processing system 900 to provide several features in accordance with the present disclosure.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EEPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX

```
/************************************************************************
****************************************************
*       THE BELOW QUERY HELPS IDENTIFY THE TIMESTAMP FOR EACH
SOURCE TARGET UNTIL WHICH ALL OUTBOUND RECORDS ARE AVAILABLE
WITH MATCHING GROUP COUNTS
*       i.e ALL THE OUTBOUND ROWS FOR THE MESSAGES ARE AVAILABLE
IN THE TABLE
*       ATTRIBUTE4 - Sort Column
*       ID - Unique Identifier (PK)
*       SEQUENCE_TARGET - Target
*       E2E_GROUP_COUNT - Group Count
************************************************************************
****************************************************/
/**
* WITH CLAUSE - PERFORMS AN OUTER JOIN BETWEEN
INTERFACE_INBOUND AND INTERFACE_OUTBOUND ROWS JOINED BASED ON
THE E2E_SRC_SEQ_ID AND ID. A GROUPING IS DONE
* BASED ON SEQUENCE-TARGET AND ID TO EXTRACT THE COUNT OF
INTERFACE_OUTBOUND ROWS PRESENT FOR EACH INTERFACE_INBOUND ROW.
* COUNT(*) COUNT - COUNT OF OUT-BOUND ROWS PRESENT. (IT WILL BE 1
WHEN NO OUT-BOUND IS PRESENT, BUT MSG_COUNT WILL BE NULL IN THIS
CASE)
* INBOUND_SEQ.ID - SOURCE SEQUENCE ID
* INBOUND_SEQ.SEQUENCE_TARGET - SOURCE SEQUENCE TARGET
* MAX(OUTBOUND_SEQ.E2E_GROUP_COUNT) MSG_COUNT - GROUP COUNT
OF THE OUTBOUND MESSAGE
* MAX(INBOUND_SEQ.ATTRIBUTE4) TSTP - SORT TIMESTAMP
*
* SELECT CLAUSE 1 - QUERIES THE MINIMUM ATTRIBUTE4 VALUE WHICH
HAS NOT BEEN SATISFIED YET WITH POS AS 1
* - OUT-BOUND ROW IS ABSENT (MSG_COUNT IS NULL) OR
* - GROUP COUNT IS NOT MATCHES YET COUNT!= MSG_COUNT
* SELECT CLAUSE 2 - SELECTS THE SEQUENCE-TARGET AND THE MAX
TIMESTAMP WITH POS A 2
*
* THE QUERY UNIONS CLAUSES 1 AND 2 SORTING BY POSITION,
* CLAUSE 1 IS REQUIRED WHEN THERE ARE SUBSEQUENT MESSAGES
WHICH ARE NOT DONE YET AND HENCE IS USED FIRST (BASED ON SORT ORDER
BY POS)
* CLAUSE 2 IS USED WHEN THERE ARE NO PENDING RECORDS FOR THE
TARGET(IN WHICH CASE CLAUSE 1 WILL NOT RETURN ANY ROWS)
*/
QUERY Q1:
WITH TAB AS
(SELECT Count(*) COUNT, INBOUND_SEQ.ID,
INBOUND_SEQ.SEQUENCE_TARGET, MAX(OUTBOUND_SEQ.E2E_GROUP_COUNT)
MSG_COUNT, MAX(INBOUND_SEQ.ATTRIBUTE4) TSTP
FROM B2B_SEQUENCE_MANAGER INBOUND_SEQ LEFT JOIN
B2B_SEQUENCE_MANAGER OUTBOUND_SEQ ON INBOUND_SEQ.ID =
OUTBOUND_SEQ.E2E_SRC_SEQUENCE_ID
WHERE INBOUND_SEQ.DIRECTION = 'INBOUND'
GROUP BY INBOUND_SEQ.SEQUENCE_TARGET, INBOUND_SEQ.ID)
(SELECT SEQUENCE_TARGET, TO_CHAR(TO_NUMBER(MIN(TSTP)) - 1)
```

APPENDIX-continued

```
MAX_TSTP, 1 POS FROM TAB WHERE (MSG_COUNT is null or COUNT!=
MSG_COUNT) group by SEQUENCE_TARGET
       union all
SELECT SEQUENCE_TARGET, MAX(TSTP) MAX_TSTP, 2 POS FROM TAB
group by SEQUENCE_TARGET) ORDER BY SEQUENCE_TARGET, POS
/****************************************************************
****************************************************
*      THE BELOW 2 QUERIES ARE USED IN CONJUNCTION WITH THE
ABOVE QUERY BY THE SPECIAL DISPATCHER THREAD
*      USING THE BELOW 2 QUERIES, ALL RECORDS WITH THE TIMESTAMP
< THE VALUE RETRIEVED FOR THE CORRESPDONDING TARGET ARE MARKED
OUTBOUND
*      SO THAT DISPATCHER CAN PICK THEM. THE CORRESPONDING
INBOUND ROWS ARE ALSO DELETED.
****************************************************************
****************************************/
QUERY Q2:
UPDATE B2B_SEQUENCE_MANAGER SET DIRECTION = 'OUTBOUND' WHERE
DIRECTION = 'INTERFACE_OUTBOUND' AND E2E_SRC_TARGET = ? and
ATTRIBUTE4 <= ?;
QUERY Q3:
DELETE FROM B2B_SEQUENCE_MANAGER WHERE DIRECTION = 'INBOUND'
AND SEQUENCE_TARGET = ? and ATTRIBUTE4 <= ?
/****************************************************************
**********************
* THE BELOW QUERY IS USED BY THE NORMAL DISPATCHER TO RETRIEVE
MESSAGES TO BE DELIVERED IN ORDER
/****************************************************************
************************/
QUERY Q4:
select .. from b2b_sequence_manager where sequence_target = ? and direction =
'OUTBOUND' SORT BY ATTRIBUTE4;
```

What is claimed is:

1. A method performed in a digital processing system, the method comprising:

receiving a respective set of input messages of a plurality of sets of input messages from a corresponding source system of a plurality of source systems, the messages of each set of input messages being received in a corresponding chronological order;

processing said plurality of sets of input messages using parallel processing approaches, wherein processing of each input message causes generation of one or more output messages to corresponding destination systems of a plurality of destination systems, wherein information identifying the destination system for each output message is available only during processing of the corresponding input message, wherein the processing of a subset of said set of input messages received from a first source system causes generation of a set of output messages to be transmitted to a first destination system, wherein said set of output messages are generated in a first sequence; and transmitting each output message to each destination system only after output messages of all prior input messages from the same source system to the destination system are transmitted, wherein output messages resulting from input messages from different source systems are transmitted out-of-sequence, wherein said subset of said set of input messages are received in a second sequence from said first source system, wherein said set of output messages are transmitted to said first destination system in a third sequence such that each output message of the set of output messages by processing a first input message is transmitted only after output messages generated for all of the subset of input messages received prior to the first input message according to said second sequence, wherein said first input message and a second input message are received at a first time instance and then at a second time instance from said first source system in said second sequence, wherein said processing generates a first output message and a second output message corresponding to said first input message and said second input message respectively for transmission to a first destination system, wherein said first output message and said second output message are available for transmission by a third time instance and a fourth time instance respectively in said first sequence, wherein said second time instance is after said first time instance and wherein said third time instance is after said fourth time instance such that said second output message is available for transmission before said first output message, wherein said transmitting comprises blocking transmission of said second output message until said first output message is transmitted in view of said first input message being received earlier than said second input message from said first source system, and said first output message and said second output message being destined to same first destination system, wherein said third sequence comprises said first output message before said second output message, wherein each of said digital processing system, said plurality of source systems and said plurality of destination systems comprises at least a corresponding processor and a corresponding memory.

2. The method of claim 1, wherein a third input message is received from said first source system at a fifth time instance which is between said first time instance and said second time instance in said second sequence, wherein said processing generates a third plurality of multicast output messages by processing said third input message, wherein a fifth multicast output message and a sixth multicast output message of said third plurality of multicast output messages are generated also for transmission to said first destination system, wherein a seventh multicast output message of said third plurality of multicast output messages is generated for transmission to a second destination system, wherein said transmitting comprises blocking transmission of said seventh multicast output message to said second destination system until all of said third plurality of multicast output messages, including said fifth multicast output message and said sixth multicast output message destined to said first destination system, are available for transmission.

3. The method of claim 2, wherein said transmitting comprises blocking transmission of said second output message to said first destination system until all of said plurality of multicast output messages are available for transmission to respective destination systems.

4. The method of claim 3, wherein said transmitting transmits said seventh multicast output message to said second destination system ahead of said first output message to said first destination system after all of said plurality of multicast output messages are available for transmission.

5. The method of claim 4, wherein said processing generates a count of the number of output messages to be generated for each input message which is a multicast message such that a first value corresponding to said count is generated for said third input message, said transmitting using said count to block transmission of each of said plurality of multicast messages until all of said plurality of multicast messages are available for transmission.

6. The method of claim 5, wherein said output messages are generated asynchronously by said processing, and said output messages are transmitted in a transmission order, said method further comprising:

queuing said output messages, with messages corresponding to each destination system being queued in a corresponding output queue;

maintaining data indicating a time stamp of arrival of each input message, a source system from which the input message is received and a status of each message indicating whether processing of the input message is already complete, wherein said transmitting dispatches each output message in an output queue to the corresponding destination system only if said maintained data indicates completion of processing of input messages having earlier time stamps than an input message for which the output message has been generated.

7. The method of claim 1, wherein said data is maintained in the form of a single table of a database system and a single dispatcher block examines said data to determine whether or not each output message in each of said queues is ready or not for said transmitting.

8. A non-transitory computer readable storage medium storing one or more sequences of instructions for causing an ERP (enterprise resource planning) system to process messages, wherein execution of said one or more sequences of instructions by one or more processors contained in said ERP system causes said ERP system to perform the actions of:

receiving a respective set of input messages of a plurality of sets of input messages from a corresponding source system of a plurality of source systems, the messages of each set of input messages being received in a corresponding chronological order;

processing said plurality of sets of input messages using parallel processing approaches, wherein processing of each input message causes generation of one or more output messages to corresponding destination systems of a plurality of destination systems, wherein information identifying the destination system for each output message is available only during processing of the corresponding input message, wherein the processing of a subset of said set of input messages received from a first source system causes generation of a set of output messages to be transmitted to a first destination system, wherein said set of output messages are generated in a first sequence; and transmitting each output message to each destination system only after output messages of all prior input messages from the same source system to the destination system are transmitted, wherein output messages resulting from input messages from different source systems are transmitted out-of-sequence, wherein said subset of said set of input messages are received in a second sequence from said first source system, wherein said set of output messages are transmitted to said first destination system in a third sequence such that each output message of the set of output messages by processing a first input message is transmitted only after output messages generated for all of the subset of input messages received prior to the first input message according to said second sequence, wherein said first input message and a second input message are received at a first time instance and then at a second time instance from said first source system in said second sequence, wherein said processing generates a first output message and a second output message corresponding to said first input message and said second input message respectively for transmission to a first destination system, wherein said first output message and said second output message are available for transmission by a third time instance and a fourth time instance respectively in said first sequence, wherein said second time instance is after said first time instance and wherein said third time instance is after said fourth time instance such that said second output message is available for transmission before said first output message, wherein said transmitting comprises blocking transmission of said second output message until said first output message is transmitted in view of said first input message being received earlier than said second input message from said first source system, and said first output message and said second output message being destined to same first destination system, wherein said third sequence comprises said first output message before said second output message, wherein each of said ERP system, said plurality of source systems and said plurality of destination systems comprises at least a corresponding processor and a corresponding memory.

9. The non-transitory computer readable medium of claim 8, wherein a third input message is received from said first source system at a fifth time instance which is between said first time instance and said second time instance in said second sequence, wherein said processing generates a third plurality of multicast output messages by processing said third input message, wherein a fifth multicast output message and a sixth multicast output message of said third plurality of multicast output messages are generated also for transmission to said first destination system, wherein a seventh multicast output message of said third plurality of multicast output messages is generated for transmission to a second destination system, wherein said transmitting comprises blocking transmission of said seventh multicast output message to said second destination system until all of said third plurality of multicast output messages, including said fifth multicast output message and said sixth multicast output message destined to said first destination system, are available for transmission.

10. The non-transitory computer readable medium of claim 9, wherein said transmitting comprises blocking transmission of said second output message to said first destination system until all of said plurality of multicast output messages are available for transmission to respective destination systems.

11. The non-transitory computer readable medium of claim 10, wherein said transmitting transmits said seventh multicast output message to said second destination system ahead of said first output message to said first destination system after all of said plurality of multicast output messages are available for transmission.

12. The non-transitory computer readable medium of claim 11, wherein said processing generates a count of the number of output messages to be generated for each input message which is a multicast message such that a first value corresponding to said count is generated for said third input message, said transmitting using said count to block transmission of each of said plurality of multicast messages until all of said plurality of multicast messages are available for transmission.

13. The non-transitory computer readable medium of claim 12, wherein said output messages are generated asynchronously by said processing, and said output messages are transmitted in a transmission order, said instructions further for:
  queuing said output messages, with messages corresponding to each destination system being queued in a corresponding output queue;
  maintaining data indicating a time stamp of arrival of each input message, a source system from which the input message is received and a status of each message indicating whether processing of the input message is already complete,
  wherein said transmitting dispatches each output message in an output queue to the corresponding destination system only if said maintained data indicates completion of processing of input messages having earlier time stamps than an input message for which the output message has been generated.

14. An enterprise resource planning (ERP) system comprising:
  a memory to store instructions;
  a processor to retrieve instructions from said memory and to execute the retrieved instructions, wherein execution of said instructions causes said ERP system to perform the actions of:
  receiving a respective set of input messages of a plurality of sets of input messages from a corresponding source system of a plurality of source systems, the messages of each set of input messages being received in a corresponding chronological order;
  processing said plurality of sets of input messages using parallel processing approaches, wherein processing of each input message causes generation of one or more output messages to corresponding destination systems of a plurality of destination systems, wherein information identifying the destination system for each output message is available only during processing of the corresponding input message,
  wherein the processing of a subset of said set of input messages received from a first source system causes generation of a set of output messages to be transmitted to a first destination system, wherein said set of output messages are generated in a first sequence; and
  transmitting each output message to each destination system only after output messages of all prior input messages from the same source system to the destination system are transmitted,
  wherein output messages resulting from input messages from different source systems are transmitted out-of-sequence,
  wherein said subset of said set of input messages are received in a second sequence from said first source system,
    wherein said set of output messages are transmitted to said first destination system in a third sequence such that each output message of the set of output messages by processing a first input message is transmitted only after output messages generated for all of the subset of input messages received prior to the first input message according to said second sequence,
  wherein said first input message and a second input message are received at a first time instance and then at a second time instance from said first source system in said second sequence,
  wherein said processing generates a first output message and a second output message corresponding to said first input message and said second input message respectively for transmission to a first destination system, wherein said first output message and said second output message are available for transmission by a third time instance and a fourth time instance respectively in said first sequence,
  wherein said second time instance is after said first time instance and wherein said third time instance is after said fourth time instance such that said second output message is available for transmission before said first output message,
  wherein said transmitting comprises blocking transmission of said second output message until said first output message is transmitted in view of said first input message being received earlier than said second input message from said first source system, and said first output message and said second output message being destined to same first destination system,
  wherein said third sequence comprises said first output message before said second output message.

15. The ERP system of claim 14, wherein a third input message is received from said first source system at a fifth time instance which is between said first time instance and said second time instance in said second sequence,
  wherein said processing generates a third plurality of multicast output messages by processing said third input message, wherein a fifth multicast output message and a sixth multicast output message of said third plurality of multicast output messages are generated also for transmission to said first destination system, wherein a seventh multicast output message of said third plurality of multicast output messages is generated for transmission to a second destination system, wherein said transmitting comprises blocking transmission of said seventh multicast output message to said second destination system until all of said third plurality of multicast output messages, including said fifth multicast output message and said sixth multicast output message destined to said first destination system, are available for transmission.

16. The ERP system of claim 15, wherein said transmitting blocks transmission of said second output message to said first destination system until all of said plurality of multicast output messages are available for transmission to respective destination systems.

17. The ERP system of claim 16, wherein said transmitting transmits said seventh multicast output message to said second destination system ahead of said first output message to said first destination system after all of said plurality of multicast output messages are available for transmission.

18. The ERP system of claim 14, wherein said data is maintained in the form of a single table of a database system and a single dispatcher block examines said data to determine whether or not each output message in each of said queues is ready or not for said transmitting.

19. The non-transitory computer readable storage medium of claim 8, wherein said data is maintained in the form of a single table of a database system and a single dispatcher block examines said data to determine whether or not each output message in each of said queues is ready or not for said transmitting.

* * * * *